(12) United States Patent  (10) Patent No.: US 12,371,998 B2
Snider  (45) Date of Patent: Jul. 29, 2025

(54) NESTED DAMPER PIN AND VIBRATION DAMPENING SYSTEM FOR TURBINE NOZZLE OR BLADE

(71) Applicant: GE Infrastructure Technology LLC, Greenville, SC (US)

(72) Inventor: Zachary John Snider, Pelzer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/343,980

(22) Filed: Jun. 29, 2023

(65) Prior Publication Data

US 2025/0003344 A1   Jan. 2, 2025

(51) Int. Cl.
*F01D 5/26*  (2006.01)
*F01D 5/10*  (2006.01)

(52) U.S. Cl.
CPC .................. *F01D 5/26* (2013.01); *F01D 5/10* (2013.01); *F05D 2260/96* (2013.01)

(58) Field of Classification Search
CPC ..... F01D 5/00; F01D 5/10; F01D 5/12; F01D 5/16; F01D 5/26; F01D 25/06;
(Continued)

(56) References Cited

U.S. PATENT DOCUMENTS 1,667,732 A * 5/1928 Henson .................. E05B 83/243
  70/448
2,689,107 A * 9/1954 Odegaard .................. F01D 5/16
  416/500

(Continued)

FOREIGN PATENT DOCUMENTS

EP  3894664 B1  7/2023
GB  1507811 A   4/1978
(Continued)

OTHER PUBLICATIONS

Kennametal Introduces First Stellite Powder For Laser Powder Bed Additive Manufacturing Apr. 6, 2021. Retreived on May 30, 2023 from www.kennametal.com/us/en/about-us/news/kennametal-news/ stel lite-powder-for-laser-powder-bed-additive-manufacturing .html (Year: 2021) (2 pages).

(Continued)

*Primary Examiner* — David E Sosnowski
*Assistant Examiner* — Wayne A Lambert
(74) *Attorney, Agent, or Firm* — Charlotte Wilson; James Pemrick; Hoffman Warnick LLC

(57) ABSTRACT

A vibration dampening system is provided for a turbine nozzle or blade. A body opening extends through the turbine nozzle or blade, e.g., through the airfoil among potentially other parts of the nozzle or blade. A vibration dampening system includes a plurality of stacked damper pins within the body opening. Each damper pin includes an outer body having defined therein an inner opening and a plurality of side openings extending from the inner opening through an outer surface of the outer body; and an inner body that is nested and movable within the inner opening of the outer body. The inner body includes a first portion including a plurality of arms, each arm extending through a respective side opening of the outer body to frictionally engage the body opening. The end surfaces of the damper pins and the two bodies frictionally engage to dampen vibration.

18 Claims, 10 Drawing Sheets

(58) Field of Classification Search
CPC ............. F05D 2260/96; F05D 2230/22; F05D 2230/232; F05D 2230/234; F05D 2230/30; F05D 2230/51; F05D 2240/40; F05D 2250/231; Y10S 292/53; Y10S 292/54; Y10S 292/60; B22F 10/28; B22F 5/003; B22F 5/009; B33Y 80/00
USPC ..................................................... 292/307 R
See application file for complete search history.

(56) References Cited

U.S. PATENT DOCUMENTS

| | | | |
|---|---|---|---|
| 2,771,267 A | | 11/1956 | Weymouth, Jr. |
| 2,862,686 A | * | 12/1958 | Bartlett .................... F01D 5/16 416/500 |
| 2,984,453 A | * | 5/1961 | Heymann ................. F01D 5/16 416/500 |
| 2,999,669 A | * | 9/1961 | McGinnis ................. F01D 5/16 416/500 |
| 3,881,844 A | | 5/1975 | Hennessey et al. |
| 4,183,567 A | * | 1/1980 | Bone ................ B65D 63/1081 292/318 |
| 4,765,751 A | | 8/1988 | Pannone et al. |
| 5,284,011 A | | 2/1994 | Von Benken |
| 5,407,321 A | * | 4/1995 | Rimkunas ................ F01D 5/16 416/500 |
| 5,558,497 A | * | 9/1996 | Kraft ........................ F01D 5/26 416/500 |
| 5,568,952 A | * | 10/1996 | Ruegg ............... B65D 63/1081 292/318 |
| 5,820,343 A | | 10/1998 | Kraft et al. |
| 6,283,707 B1 | * | 9/2001 | Chin ......................... F01D 5/16 416/500 |
| 7,217,093 B2 | * | 5/2007 | Propheter ................. F01D 5/16 416/500 |
| 7,270,517 B2 | | 9/2007 | Garner |
| 7,300,256 B2 | * | 11/2007 | Masserey ................. F01D 5/16 416/232 |
| 7,413,405 B2 | | 8/2008 | Busbey et al. |
| 7,736,124 B2 | | 6/2010 | Bauer et al. |
| 7,824,158 B2 | | 11/2010 | Bauer et al. |
| 8,915,718 B2 | * | 12/2014 | Dolansky .................. F01D 5/16 416/232 |
| 9,267,380 B2 | * | 2/2016 | Houston ............... F04D 29/668 |
| 9,657,591 B2 | | 5/2017 | Schleif et al. |
| 9,657,717 B2 | | 5/2017 | Ollgaard et al. |
| 10,443,408 B2 | | 10/2019 | Kareff et al. |
| 11,187,089 B2 | | 11/2021 | Wondrasek et al. |
| 11,248,475 B2 | | 2/2022 | Wondrasek et al. |
| 11,519,276 B1 | | 12/2022 | Snider et al. |
| 11,572,791 B1 | | 2/2023 | Snider et al. |
| 11,634,991 B1 | | 4/2023 | Snider et al. |
| 11,976,565 B2 | * | 5/2024 | Snider ....................... F01D 5/16 |
| 2007/0251782 A1 | | 11/2007 | Chen et al. |
| 2010/0232968 A1 | | 9/2010 | Miller |
| 2014/0147276 A1 | | 5/2014 | Roberts, III et al. |
| 2016/0326881 A1 | * | 11/2016 | Hartung ................ F04D 29/668 |
| 2019/0017402 A1 | | 1/2019 | Martin, Jr. et al. |
| 2021/0172325 A1 | | 6/2021 | Wondrasek et al. |
| 2021/0172326 A1 | | 6/2021 | Wondrasek et al. |
| 2021/0254478 A1 | | 8/2021 | Chakrabarti et al. |
| 2021/0372286 A1 | | 12/2021 | Suryarghya et al. |
| 2023/0184117 A1 | | 6/2023 | Li et al. |

FOREIGN PATENT DOCUMENTS

| | | | | |
|---|---|---|---|---|
| GB | 2505172 A | * | 2/2014 | .......... A44C 5/0046 |
| JP | 2014084676 A | | 5/2014 | |

OTHER PUBLICATIONS

Office Action from related U.S. Appl. No. 17/815,372 dated Jun. 2, 2023 (20 pages).

Final Office Action from related U.S. Appl. No. 17/815,372 dated Oct. 23, 2023 (10 pages).

European Search Report dated Sep. 26, 2024 for related EP Application No. 24180146.3, 9 pages.

* cited by examiner

NESTED DAMPER PIN AND VIBRATION DAMPENING SYSTEM FOR TURBINE NOZZLE OR BLADE

TECHNICAL FIELD

The disclosure relates generally to dampening vibration in a turbine nozzle or blade. More specifically, the disclosure relates to a vibration dampening system including a plurality of nested damper pins.

BACKGROUND

One concern in turbine operation is the tendency of the turbine blades or nozzles to undergo vibrational stress during operation. In many installations, turbines are operated under conditions of frequent acceleration and deceleration. During acceleration or deceleration of the turbine, the airfoils of the blades are, momentarily at least, subjected to vibrational stresses at certain resonant frequencies and, in many cases, to vibrational stresses at secondary or tertiary frequencies. Nozzle airfoils experience similar vibrational stress. Variations in gas temperature, pressure, and/or density, for example, can excite vibrations throughout the rotor assembly, especially within the nozzle or blade airfoils. Gas exiting upstream of the turbine and/or compressor sections in a periodic, or "pulsating," manner can also excite undesirable vibrations. When an airfoil is subjected to vibrational stress, its amplitude of vibration can readily build up to a point which may negatively affect gas turbine operations and/or component life. Previously, stacked, solid damper pins in a turbine blade have been used to dampen vibration, but the centrifugal forces can result in locking of the damper pins together, reducing their ability to dampen vibration.

BRIEF DESCRIPTION

All aspects, examples and features mentioned below can be combined in any technically possible way.

An aspect of the disclosure provides a damper pin for a vibration dampening system for a turbine nozzle or blade, the damper pin comprising: an outer body having defined therein an inner opening and a plurality of side openings extending from the inner opening through an outer surface of the outer body; and an inner body nested and movable within the inner opening of the outer body, the inner body including a first portion including a plurality of arms, each arm extending through a respective side opening of the plurality of side openings of the outer body.

Another aspect of the disclosure includes any of the preceding aspects, and the plurality of arms defines an outer dimension greater than an outer dimension of the outer body, the outer dimension being configured to engage an inner surface of a body opening in the turbine nozzle or blade in which the damper pin is positioned.

Another aspect of the disclosure includes any of the preceding aspects, and the inner body further includes: a second portion having an outer surface configured to frictionally engage a first section of the inner opening of the outer body, a third portion extending through a second section of the inner opening of the outer body in a spaced manner, and wherein the first portion of the inner body including the plurality of arms is positioned between the second portion and the third portion of the inner body.

Another aspect of the disclosure includes any of the preceding aspects, and the outer surface of the second portion of the inner body has a bulbous portion, and the first section of the inner opening of the outer body has a complementary concave surface to the bulbous portion.

Another aspect of the disclosure includes any of the preceding aspects, and the second section of the inner opening of the outer body is spaced from the third portion of the inner body by a distance that delimits an amount of side-to-side tilting movement of the inner body within the outer body.

Another aspect of the disclosure includes any of the preceding aspects, and the outer surface of the inner body and the first section of the inner opening of the outer body frictionally engage under influence of the plurality of arms engaging an inner surface of a body opening in the turbine nozzle or blade.

Another aspect of the disclosure includes any of the preceding aspects, and the outer body further includes a first end surface and an opposing second end surface, and wherein the inner opening of the outer body extends through the first end surface and the second end surface, wherein the third portion of the inner body extends through one of the first and second end surfaces from the inner opening.

Another aspect of the disclosure includes any of the preceding aspects, and wherein the damper pin is one of a plurality of identical damper pins in the vibration dampening system; and the first end surface of the outer body of each respective damper pin is at least partially concave, and the second end surface of the outer body of each respective damper pin is at least partially convex, whereby the first end surface of the damper pin is configured to frictionally engage the second end surface of an adjacent damper pin.

Another aspect of the disclosure includes any of the preceding aspects, and the outer body and the inner body are additively manufactured, and wherein, prior to separation after the additive manufacturing, the outer body and the inner body are integrally coupled and fixed relative to one another by a removable coupling element.

Another aspect of the disclosure includes a vibration dampening system for a turbine nozzle or blade, the vibration dampening system comprising: a plurality of stacked damper pins, each damper pin including: an outer body having defined therein an inner opening and a plurality of side openings extending from the inner opening through an outer surface of the outer body; and an inner body nested and movable within the inner opening of the outer body, the inner body including a first portion including a plurality of arms, each arm extending through a respective side opening of the plurality of side openings of the outer body.

Another aspect of the disclosure includes any of the preceding aspects, and the plurality of arms define an outer dimension greater than an outer dimension of the outer body, the outer dimension being configured to engage an inner surface of a body opening in the turbine nozzle or blade in which the damper pin is positioned.

Another aspect of the disclosure includes any of the preceding aspects, and the inner body further includes: a second portion having an outer surface configured to frictionally engage a first section of the inner opening of the outer body, a third portion extending through a second section of the inner opening of the outer body in a spaced manner, and wherein the first portion of the inner body including the plurality of arms is positioned between the second portion and the third portion of the inner body.

Another aspect of the disclosure includes any of the preceding aspects, and the outer surface of the second portion of the inner body has a bulbous portion, and the first section of the inner opening of the outer body has a complementary concave surface to the bulbous portion.

Another aspect of the disclosure includes any of the preceding aspects, and the second section of the inner opening of the outer body is spaced from the third portion of the inner body by a distance that delimits an amount of side-to-side tilting movement of the inner body within the outer body.

Another aspect of the disclosure includes any of the preceding aspects, and the outer surface of the inner body and the first section of the inner opening of the outer body frictionally engage under influence of the plurality of arms engaging an inner surface of a body opening in the turbine nozzle or blade.

Another aspect of the disclosure includes any of the preceding aspects, and the outer body further includes a first end surface and an opposing second end surface, and wherein the inner opening of the outer body extends through the first end surface and the second end surface, wherein the third portion of the inner body extends through one of the first and second end surfaces from the inner opening.

Another aspect of the disclosure includes any of the preceding aspects, and the first end surface of the outer body is at least partially concave, and the second end surface of the outer body is at least partially convex, whereby the first end surface and the second end surface of adjacent damper pins frictionally engage.

Another aspect of the disclosure includes any of the preceding aspects, and the outer body and the inner body are additively manufactured, and wherein, prior to separation after the additive manufacturing, the outer body and the inner body are integrally coupled and fixed relative to one another by a removable coupling element.

Another aspect of the disclosure includes any of the preceding aspects, and further comprising a retention damper pin engaging with an endmost one of the plurality of stacked damper pins.

Another aspect of the disclosure includes a method of dampening vibration in a turbine nozzle or blade, the method comprising: during operation of the turbine nozzle or blade, dampening vibration by frictional engagement between and within a plurality of stacked damper pins, each damper pin including: an outer body having an inner opening, a first end surface and an opposing second end surface, wherein first vibration dampening occurs by frictional engagement of the first end surface and the opposing second end surface of an adjacent damper pin; and an inner body nested and movable within the inner opening of the outer body, wherein second vibration dampening occurs by frictional engagement of a portion of an outer surface of the inner body and a section of the inner opening of the outer body under influence of a plurality of arms extending from the inner body through the outer body and engaging with an inner surface of a body opening in the turbine nozzle or blade.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
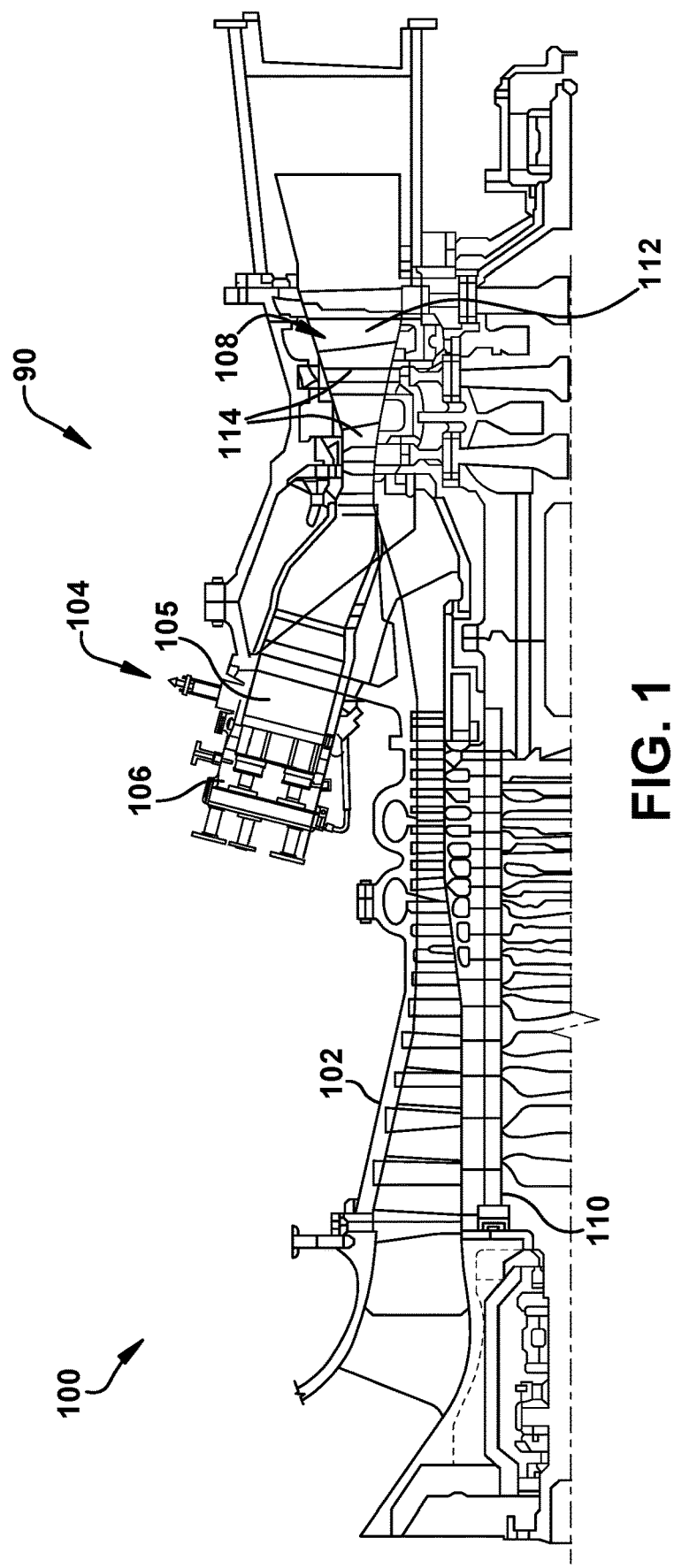
FIG. 1 shows a cross-sectional view of an illustrative turbomachine in the form of a gas turbine system including a turbine section.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to a center axis of a damper pin, the center axis of a turbine blade or nozzle, or the center axis of the turbine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a vibration dampening system for a turbine nozzle or blade. A body opening extends through the turbine nozzle or blade, e.g., through the airfoil among potentially other parts of the nozzle or blade. The vibration dampening system includes a plurality of stacked damper pins within the body opening. The damper pins each include an outer body having defined therein an inner opening and a plurality of side openings extending from the inner opening through an outer surface of the outer body, and an inner body is nested and movable within the inner opening of the outer body. Hence, the damper pins may be referenced as "nested damper pins" because they include nested parts that frictionally engage with each other to dampen vibration. The inner body includes a first portion including a plurality of arms, each arm extending through a respective side opening of the plurality of side openings of the outer body. The inner body also includes a second portion including an outer surface configured to frictionally engage a section of the inner opening of the outer body to dampen vibration. In addition, the end surfaces of the outer bodies of adjacent damper pins frictionally engage with adjacent damper pins to dampen vibration.

The vibration dampening system reduces nozzle or blade vibration with a simple arrangement and does not add much extra mass to the nozzle or blade. Accordingly, the vibration dampening system and pins do not increase centrifugal force to the nozzle base end or blade tip end or require a change in nozzle or blade configuration. The nested damper pins allow use of stacked damper pins in which the inner bodies thereof are free to continue frictional-based vibration dampening movement (via interaction of the arms with an inner surface of the body opening in the turbine nozzle or blade), even if the end surfaces of the outer bodies lock together, e.g., as may occur in turbine blades as a result of centrifugal forces experienced by blades.

Referring to the drawings, FIG. 1 is a cross-sectional view of an illustrative machine including a turbine(s) (e.g., an expansion turbine or turbine section) within which teachings of the disclosure can be applied. In FIG. 1, a turbomachine 90 in the form of a combustion turbine or gas turbine (GT) system 100 (hereinafter, "GT system 100") is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110").

GT system 100 may be, for example, a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of industrial machine or other turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
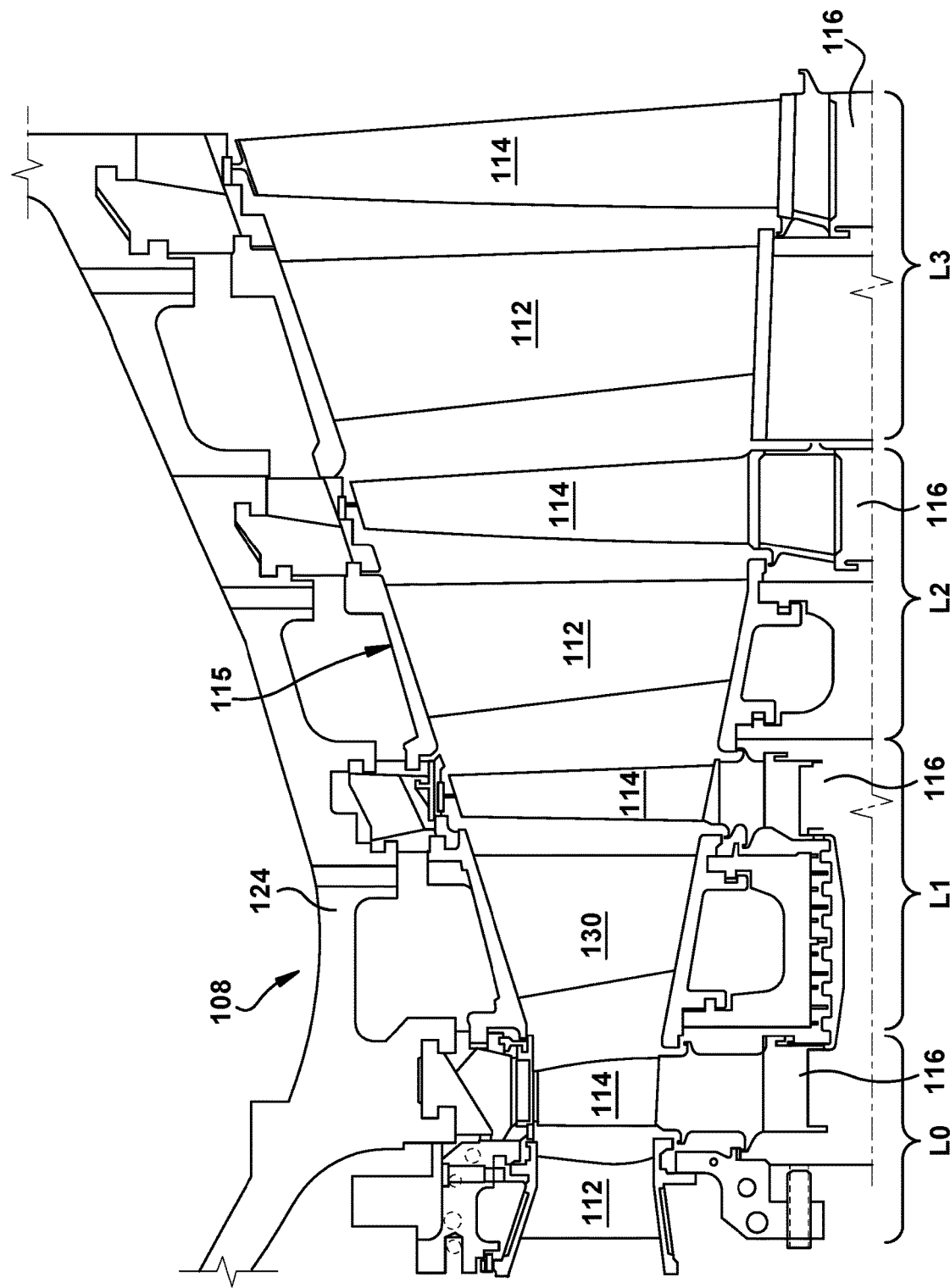
FIG. 2 shows a cross-sectional view of a portion of an illustrative turbine section as may be used in the turbomachine of FIG. 1, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of nozzles 112 mounted to a casing 124 and circumferentially spaced around rotor 110 (FIG. 1). It is recognized that blades 114 rotate with rotor 110 (FIG. 1) and thus experience centrifugal force, while nozzles 112 are static.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel to produce combustion gases. Combustor 104 is in flow communication with turbine 108, within which thermal energy from the combustion gas stream is converted to mechanical rotational energy by directing the combusted fuel (e.g., working fluid) into the working fluid path to turn blades 114. Turbine 108 is rotatably coupled to and drives rotor 110. Compressor 102 may also be rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
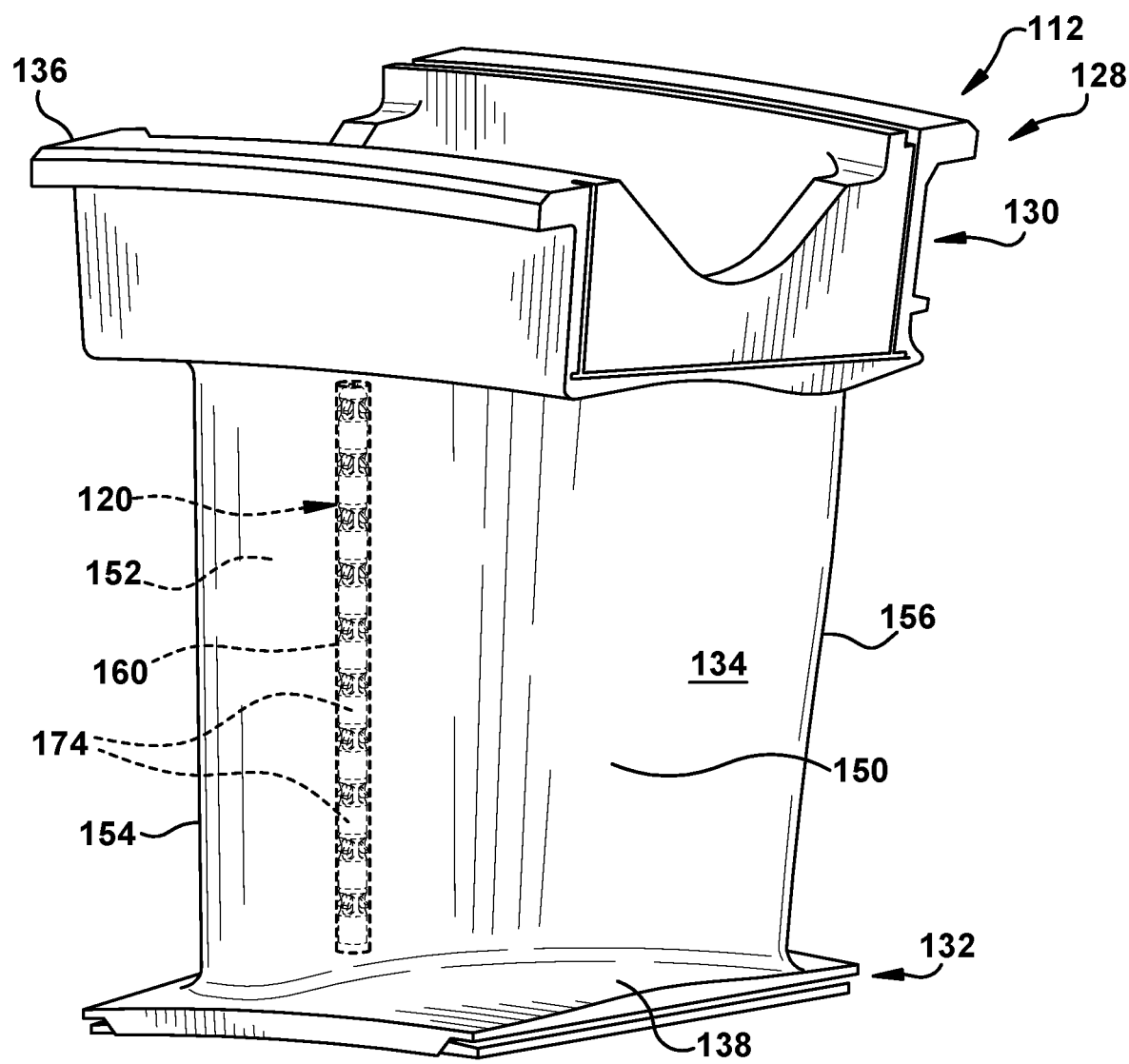
FIG. 3 shows a perspective view of an illustrative turbine nozzle including a vibration dampening system, according to embodiments of the disclosure.
Figure 4:
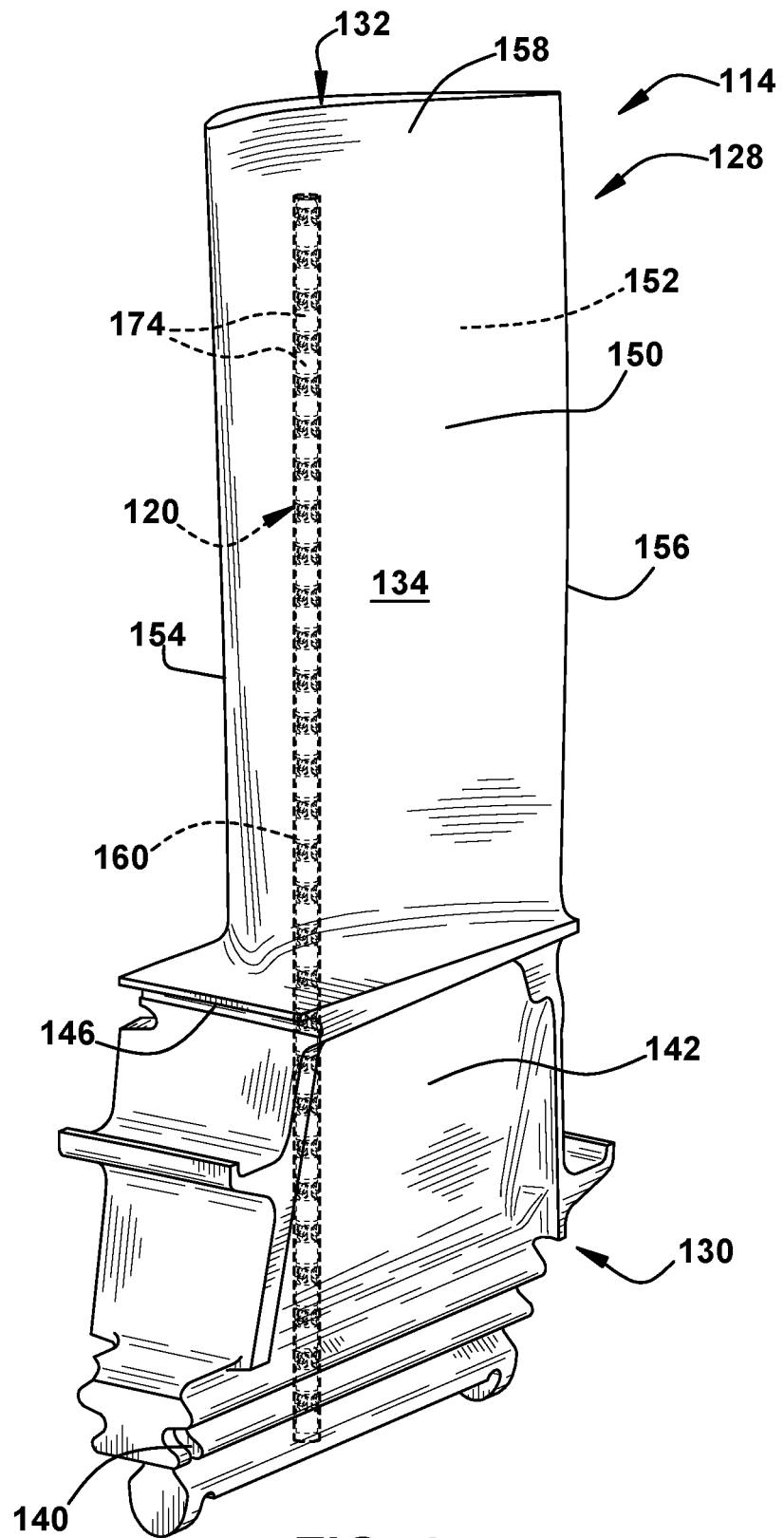
FIG. 4 shows a perspective view of an illustrative turbine blade including a vibration dampening system, according to embodiments of the disclosure.
Figure 5:
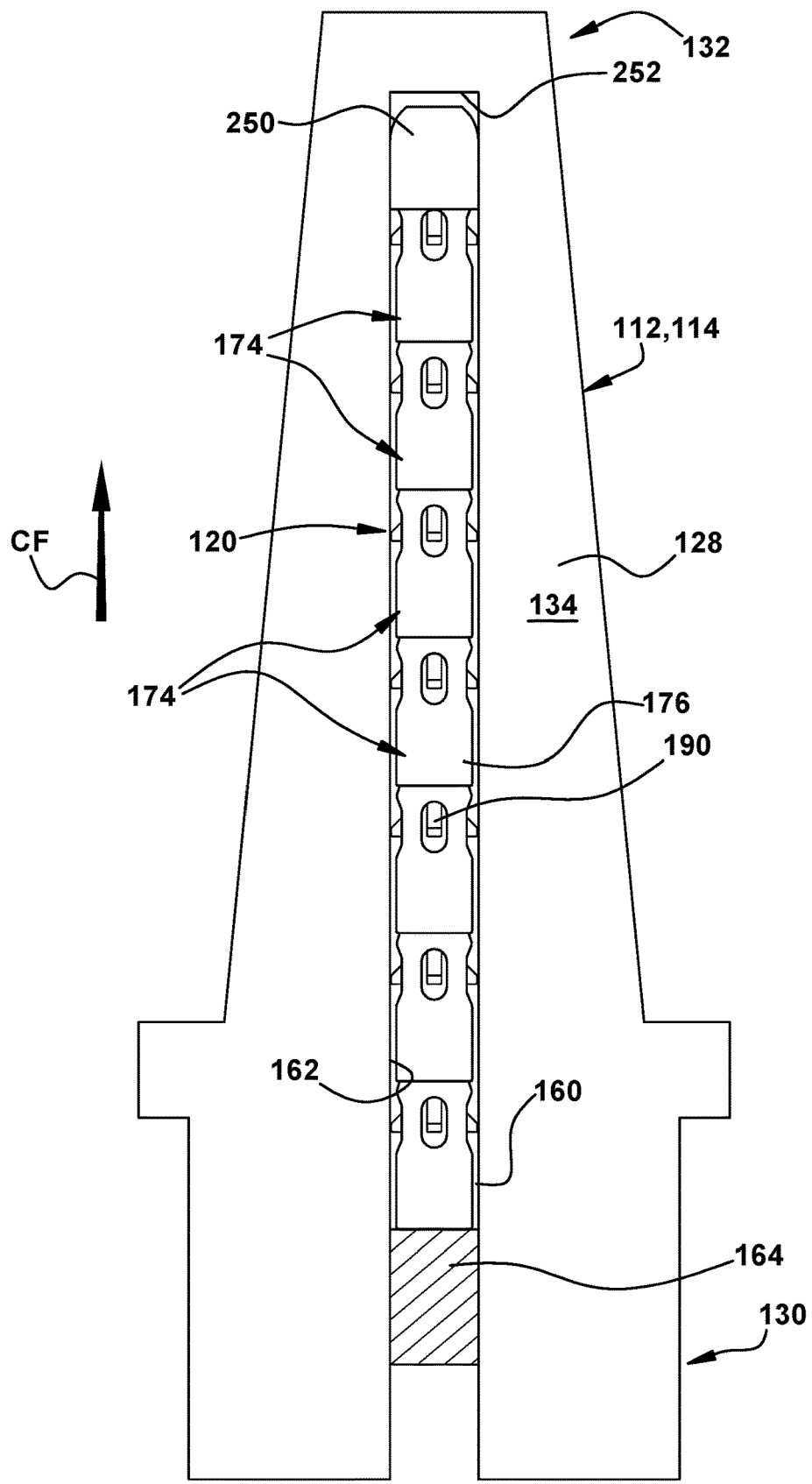
FIG. 5 shows a schematic cross-sectional view of a turbine nozzle or blade having a vibration dampening system including a plurality of damper pins, according to embodiments of the disclosure.
Figure 6:
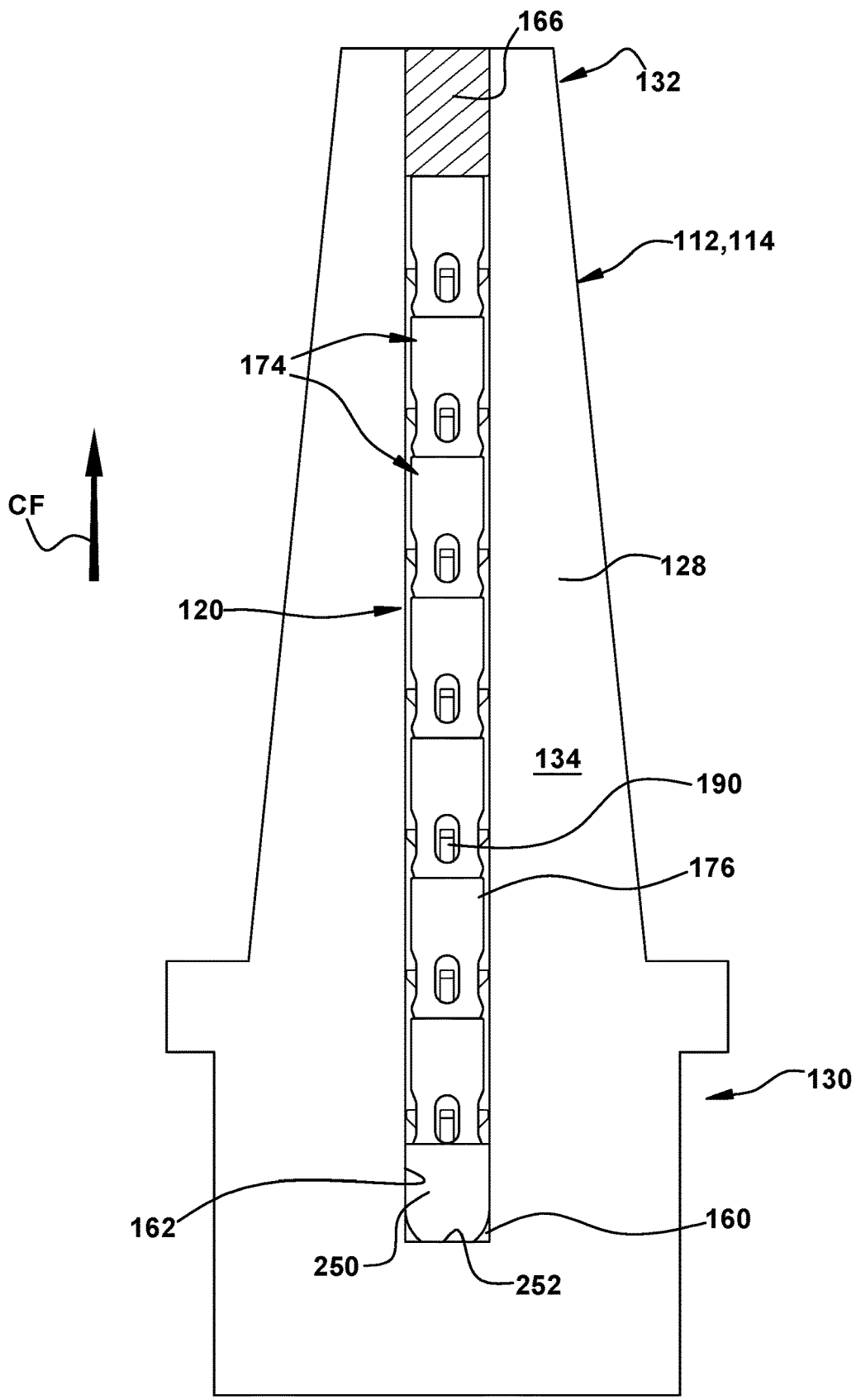
FIG. 6 shows a schematic cross-sectional view of a turbine nozzle or blade having a vibration dampening system including a plurality of damper pins, according to embodiments of the disclosure.

FIGS. 3 and 4 show perspective views, respectively, of a (stationary) nozzle 112 and a (rotating) blade 114, of the type in which embodiments of a vibration dampening system 120 of the present disclosure may be employed. As will be described herein, FIGS. 5 and 6 show schematic cross-sectional views of a nozzle 112 or blade 114 including vibration dampening system 120, according to various embodiments of the disclosure.

Referring to FIGS. 3 and 4, each nozzle 112 or blade 114 includes a body 128 having a base end 130, a tip end 132, and an airfoil 134 extending between base end 130 and tip end 132. As shown in FIG. 3, nozzle 112 includes an outer endwall 136 at base end 130 and an inner endwall 138 at tip end 132. Outer endwall 136 couples to casing 124 (FIG. 2). As shown in FIG. 4, blade 114 includes a dovetail 140 at base end 130 by which blade 114 attaches to a rotor wheel 116 (FIG. 2) of rotor 110 (FIG. 2). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine 108.

It will be appreciated that airfoil 134 in nozzle 112 and blade 114 is the active component of the nozzle 112 or blade 114 that intercepts the flow of working fluid and, in the case of blades 114, induces rotor 110 (FIG. 1) to rotate. It will be seen that airfoil 134 of nozzle 112 and blade 114 include a concave pressure side (PS) outer sidewall 150 and a circumferentially or laterally opposite convex suction side (SS) outer sidewall 152 extending axially between opposite leading and trailing edges 154, 156, respectively. Sidewalls 150 and 152 also extend in the radial direction from base end 130 (i.e., outer endwall 136 for nozzle 112 and platform 146 for blade 114) to tip end 132 (i.e., inner endwall 138 for nozzle 112 and a tip end 158 for blade 114). Note, in the example shown, although blade 114 does not include a tip shroud, teachings of the disclosure are equally applicable to a blade including a tip shroud at tip end 158. Nozzle 112 and blade 114 shown in FIGS. 3-4 are illustrative only, and the teachings of the disclosure can be applied to a wide variety of nozzles and blades.

During operation of a turbine, nozzles 112 or blades 114 may be excited into vibration by a number of different forcing functions. For example, variations in working fluid temperature, pressure, and/or density can excite vibrations throughout the rotor assembly, especially within the airfoils and/or tips of the blades 114 or nozzles 112. Gas exiting upstream of the turbine and/or compressor sections in a periodic (or "pulsating") manner can also excite undesirable vibrations. Embodiments of the present disclosure reduce the vibration of a stationary nozzle 112 or rotating turbine blade 114 without significant change of nozzle or blade design.

FIGS. 5 and 6 each show a schematic cross-sectional view of nozzle 112 or blade 114 including vibration dampening system 120 according to embodiments of the disclosure. (Nozzle 112 in the schematic cross-sectional views of FIGS. 5-6 is shown flipped vertically compared to that shown in FIG. 3 and without inner endwall 138, for ease of description. It should be understood that references to base end 130 and tip end 132 may be reversed for nozzle 112, as compared to blade 114.) Vibration dampening system 120 for nozzle 112 or blade 114 may include a body opening 160 extending through body 128 at least partially between tip end 132 and base end 130 thereof and through airfoil 134. Body opening 160 may extend part of the distance between base end 130 and tip end 132, or it may extend through one or more of base end 130 or tip end 132. Body opening 160 may be defined in any part of any structure of body 128. For example, where body 128 includes an internal partition wall (not shown), for example, for defining a cooling circuit therein, body opening 160 may be defined as an internal cavity in the partition wall in body 128. Body opening 160 generally extends radially in body 128. However, some angling, and perhaps curving, of body opening 160 relative to a radial extent of body 128 is possible. Body opening 160 has an inner surface 162.

As shown in FIG. 5, body opening 160 may originate at base end 130 of nozzle 112 or blade 114, or, as shown in FIG. 6, it may originate at tip end 132 of nozzle 112 or blade 114. More particularly, as shown in FIG. 5, body opening 160 may be open in base end 130 and terminate in tip end 132, or, as shown in FIG. 6, it may be open in tip end 132 and terminate in base end 130. The open end may assist in assembly of vibration dampening system 120 in nozzle 112 or blade 114 and may allow retrofitting of the system into an existing nozzle or blade. Where body opening 160 extends through base end 130 as shown in FIG. 5, a closure member 164 for closing body opening 160 may be provided. Where body opening 160 extends through tip end 132, as shown in FIG. 6, a closure member 166 for body opening 160 may be provided. In addition to closing body opening 160, closure members 164, 166 prevent removal of vibration dampening system 120 from body opening 160.

Vibration dampening system 120 for nozzles 112 or blades 114 may include a plurality of stacked damper pins 174. As shown in the enlarged cross-sectional views of FIGS. 7 and 8, each damper pin 174 may include an outer body 176 having defined therein an inner opening 178 and a plurality of side openings 180 extending from inner opening 178 through an outer surface 182 of outer body 176. Outer body 176 may also include a first end surface 184 and an opposing second end surface 186.

Outer body 176 may have outer surface 182 of a shape and dimension to fit within body opening 160. More particularly, body opening 160 has inner surface 162 having an inner dimension ID1, and each outer body 176 has an outer dimension OD1 sized to slidingly fit (but not necessarily fully engage) inner dimension ID1 of body opening 160. That is, outer dimension OD1 of outer body 176 of each damper pin 174 does not always rub or contact against inner surface 162 of body opening 160. During assembly, inner dimension ID1 and outer dimension OD1 are sized to allow damper pins 174 to be positioned in body opening 160. In one non-limiting example, a difference between outer dimension OD1 of outer body 176 of damper pins 174 and inner dimension ID1 of inner surface 162 of body opening 160 may be in a range of approximately 1 to 10 millimeters (mm), which allows insertion of damper pins 174 and relative movement thereof in airfoil 134 of nozzle 112 or blade 114.

First end surface 184 and second end surface 186 of outer body 176 are complementary of one another, i.e., they fit together, so they can frictionally engage one another. In the FIGS. 5-8 embodiments, first end surface 184 of outer body 176 is at least partially concave, and second end surface 186 of outer body 176 is at least partially convex. In this manner, first end surface 184 and second end surface 186 of adjacent damper pins 174 can frictionally engage and rotationally move relative to one another as nozzle 112 or blade 114 moves. End surfaces 184, 186 need not be contiguous surfaces, and may be partitioned (as shown), e.g., to reduce unnecessary weight from each damper pin 174. Other complementary shapes for end surfaces 184, 186 are also possible, such as planar ends. One way damper pins 174 dampen vibration is by having outer bodies 176 of adjacent pins frictionally engage each other, i.e., via end surfaces 184, 186. In nozzles 112, damper pins 174 frictionally engage under the influence of the force of their collective weight, and in blades 112, damper pins 174 frictionally engage under the influence of their collective weight and centrifugal forces exerted on the blade during rotation thereof. Outer body 176 also includes inner opening 178 extending through first end surface 184 and second end surface 186. As will be described, inner opening 178 has a number of different surfaces to accommodate different portions of an inner body 190.

Each damper pin 174 may also include inner body 190 nested and movable within inner opening 178 of outer body 176. Inner body 190 moves independently of outer body 176. Inner body 190 includes a first portion 192 (FIGS. 7-8) including a plurality of arms 194. Each arm 194 extends through a respective side opening 180 of plurality of side openings 180 of outer body 176. Plurality of arms 194 collectively define an outer dimension OD2 greater than an outer dimension OD1 of outer body 176. Outer dimension OD2 of arms 194 is configured to engage inner surface 162 of body opening 160 in turbine nozzle 112 or blade 114 in which the damper pin 174 is positioned as turbine nozzle 112 or blade 114 vibrates.

In the example shown, four arms 194, each in respective side openings 180, are shown (one hidden into page). However, any number of arms 194 and respective side openings 180 can be provided so long as sliding movement between outer body 176 and inner body 190 can occur, e.g., two, three, five or six arms are possible. While shown as equal in numbers, not all side openings 180 require an arm 194 therein, i.e., some may be empty. Side openings 180 are sized so as to not interfere with movement of arms 194 during operation of vibration dampening system 120. An outer dimension of outer body 176 may taper where side openings 180 are defined therein, e.g., to reduce weight and an amount of required material.

Arms 194 may have any shape to provide sufficient structural strength to move inner body 190 relative to outer body 176. In the example shown, arms 194 have a generally triangular shape with a flattened outer end 195 that engages inner surface 162 of body opening 160. Flattened outer ends 195 may be configured to be parallel to inner surface 162 of body opening 160, e.g., during insertion of damper pins 174. Alternatively, flattened outer ends 195 of arms 194 may be slightly angled from parallel to inner surface 162 of body opening 160 to, for example, assist insertion of damper pins 174 and ensure non-binding engagement with inner surface 162 of body opening 160 during use. Flattened outer ends 195 can have any surface roughness, e.g., rougher than inner surface 162 of body opening 160, to ensure proper insertion and operational engagement with inner surface 162 of body opening 160.

Inner body 190 and inner opening 178 of outer body 176 may take a variety of forms. In certain embodiments, shown in FIGS. 7-8, inner body 190 has a second portion 196 configured to frictionally engage a first section 198 of inner opening 178 of outer body 176. More particularly, outer surface 200 of second portion 196 of inner body 190 may have a bulbous portion 202, and first section 198 of inner opening 178 of outer body 176 may have a complementary concave surface 204 to bulbous portion 202. In this manner, bulbous portion 202 and concave surface 204 may frictionally engage as inner body 190 moves laterally or tilts in outer body 176 during vibration and/or bending of nozzle 112 or blade 114. Bulbous portion 202 can be internally solid or hollow (for the latter, see FIG. 10). The engagement of bulbous portion 202 and concave surface 204 are configured to delimit the extent of radial movement (relative to the turbine axis) of inner body 190 relative to a respective outer body 176.

Figure 7:
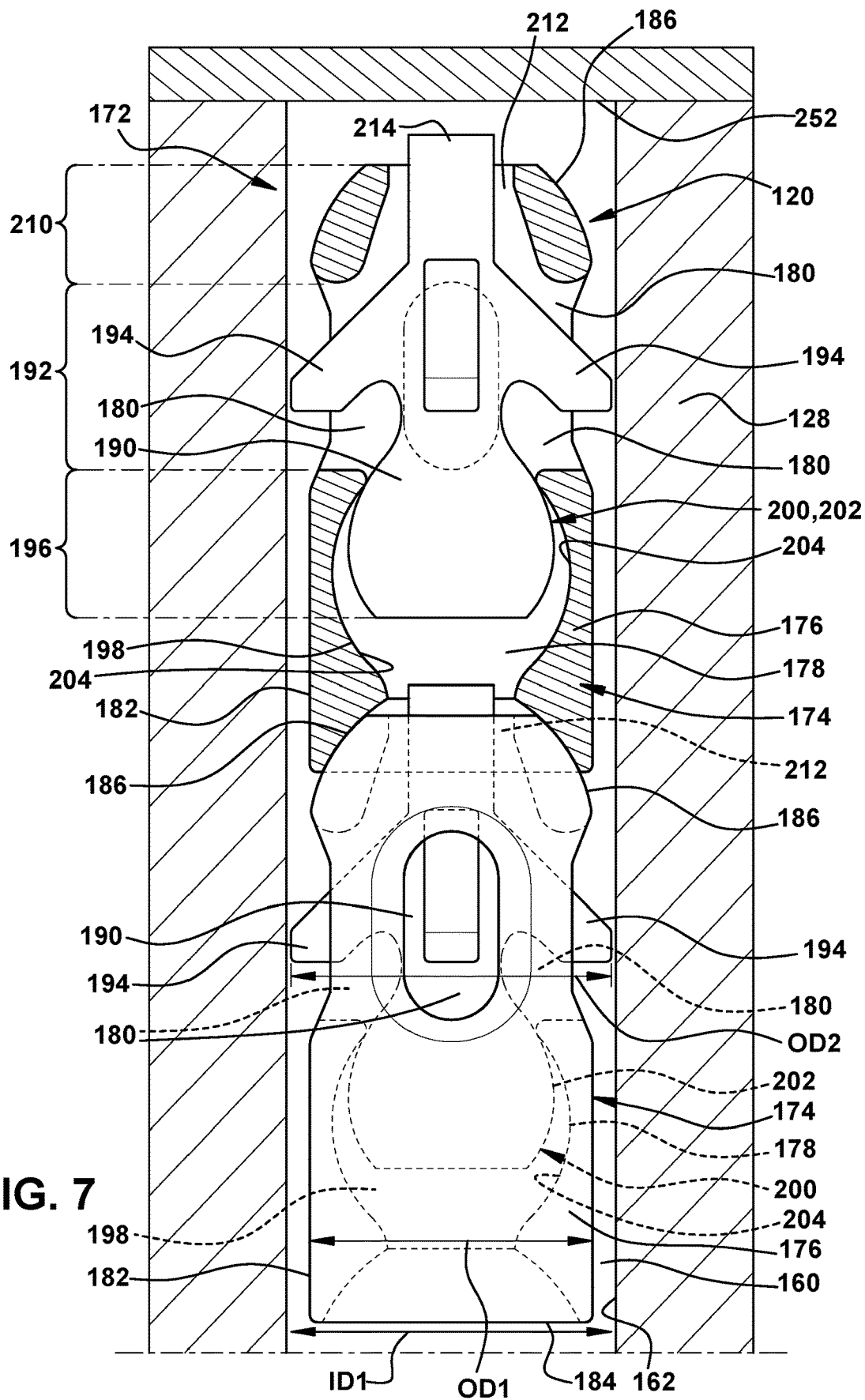
FIG. 7 shows a cross-sectional enlarged view of a pair of damper pins of FIG. 5, each damper pin including an outer body and an inner body, according to embodiments of the disclosure.
Figure 8:
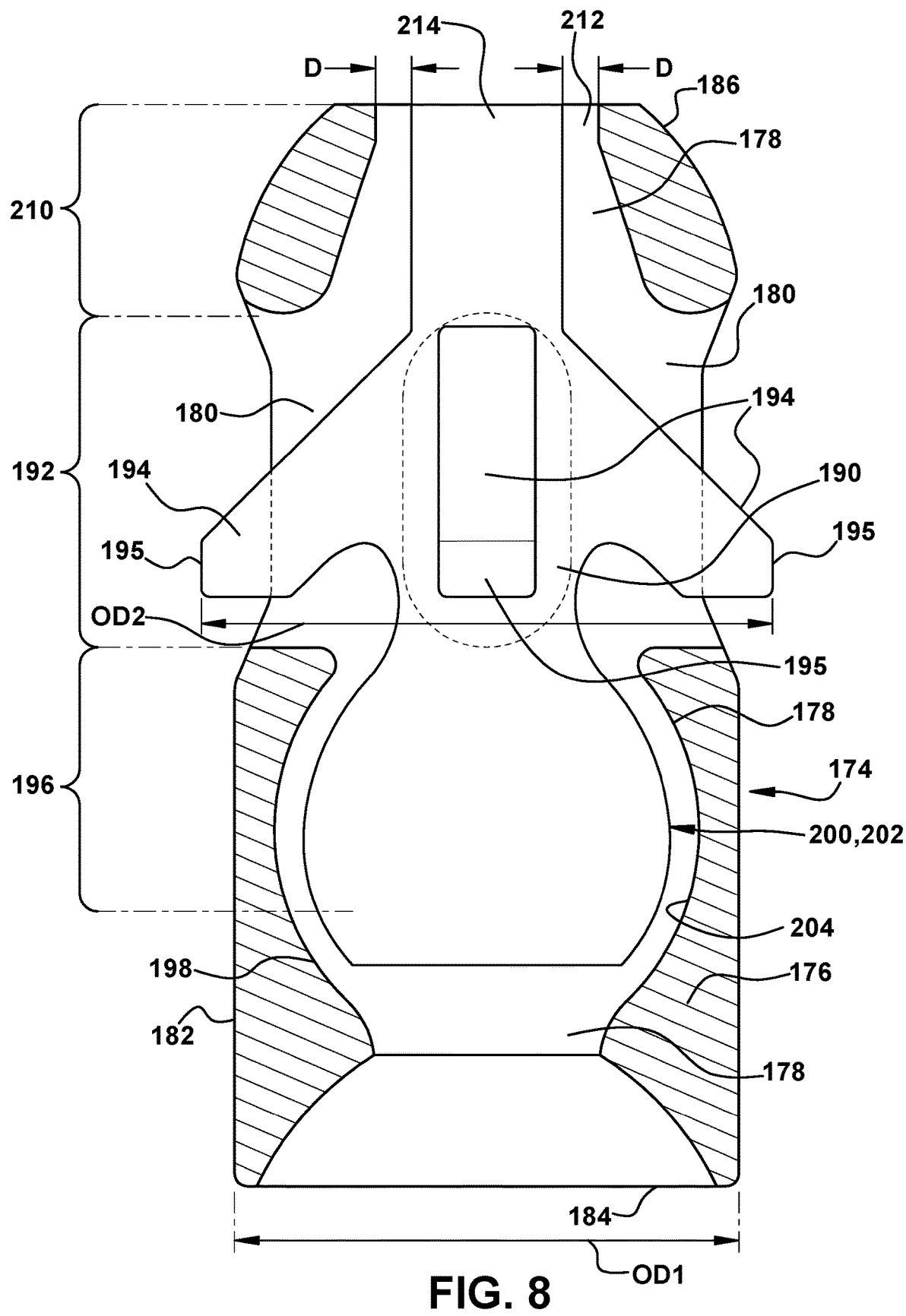
FIG. 8 shows a cross-sectional view of a damper pin of FIGS. 5-7, which includes an outer body and an inner body, according to other embodiments of the disclosure.
Figure 9:
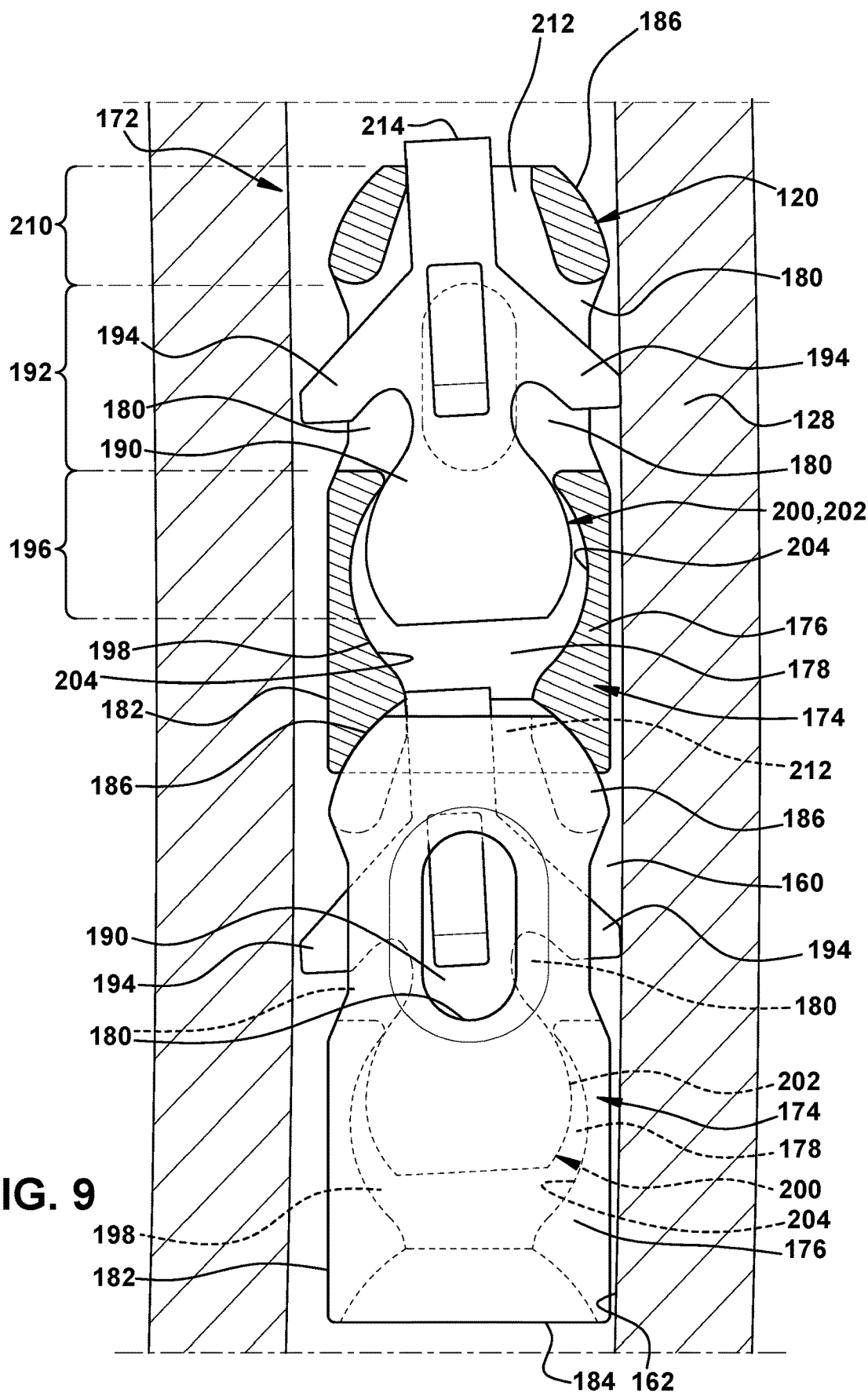
FIG. 9 shows a cross-sectional view of a damper pin of FIGS. 5-8 with an inner body thereof in frictional engagement with an outer body thereof, according to embodiments of the disclosure.

Inner body 190 may also include a third portion 210 extending through one of first end surface 184 and second end surface 186 from inner opening 178. In the example shown, third portion 210 extends through second end surface 186 from inner opening 178. As will be further described, third portion 210 extends through a second section 212 of inner opening 178 of outer body 176 in a (radially) spaced manner. Third portion 210 of inner body 190 may have any shape configured to pass through second section 212. In one non-limiting example, third portion 210 includes a cylindrical element 214 extending axially from first portion 192 including plurality of arms 194. As shown in FIG. 7, third portion 210 may extend out past end surface 186 of outer body 176, or, as shown in FIG. 8, it may be within second section 212 of outer body 190, i.e., flush with or within an end of second section 212. As illustrated, first portion 192 of inner body 190, including plurality of arms 194, is positioned between second portion 196 (with bulbous portion 202) and third portion 210 of inner body 190. As shown in FIG. 8, second section 212 of inner opening 178 of outer body 176 is spaced from third portion 210 of inner body 190 by a distance D that delimits an amount of side-to-side tilting movement of inner body 190 within outer body 176 during use. More particularly, as shown in FIG. 9, as inner body 190 moves within outer body 176 under the encouragement of arms 194 engaging inner surface 162 of body opening 160, third portion 210 of inner body 190 can move side-to-side until it contacts second section 212 of inner opening 178.

Portions 192, 196, 210 of inner body 190 are integral to one another, i.e., it is a unitary structure. However, inner bodies 190 of adjacent damper pins 174 do not contact one another and move independently of one another.

Any number of damper pins 174 may be used in vibration dampening system 120 depending on, among other factors, the length of nozzle 112 or blade 114, desired vibration dampening, and/or available space. An endmost one of damper pins 174 in a stack may abut an end 252 of body opening 160, see e.g., FIG. 7. Alternatively, as shown in FIGS. 5 and 6, retention damper pin 250 may be positioned to engage with an endmost one of the plurality of stacked damper pins 174. Retention damper pin 250 may act to protect the endmost one of the plurality of stacked damper pins 174 near end 252 of body opening 160. In this case, damper pins 174 abut retention damper pin 250 rather than end 252 of body opening 160, and retention damper pin 250 abuts end 252 of body opening 160.

FIG. 5 shows an embodiment in which body opening 160 is closed at tip end 132 of nozzle 112 or blade 114, and closure member 164 closes base end 130. In the example shown, retention damper pin 250 is positioned at tip end 132 of nozzle 112 or blade 114 and stacked damper pins 174 to prevent stacked damper pins 174 from hitting end 252 of body opening 160. As noted, damper pins 174 may alternatively abut end 252 of body opening 160 in tip end 132. Centrifugal force (arrow CF) on a blade 114 will force stacked damper pins 174 against retention damper pin 250 and/or end 252 of body opening 160 in tip end 132 of body 128 of turbine blade 114 as the blade rotates. Similarly, for a static nozzle 112, the weight of damper pins 174 will force them against closure member 164. Body opening 160 in base end 130 may be closed by any now known or later developed closure member 164.

FIG. 6 shows an embodiment in which body opening 160 is closed at base end 130 of nozzle 112 or blade 114, and closure member 166 closes tip end 132. In the example shown, retention damper pin 250 is positioned at base end 130 of nozzle 112 or blade 114 and stacked damper pins 174 to prevent plurality of stacked damper pins 174 from hitting end 252 of body opening 160. As noted, damper pins 174 may alternatively abut end 252 of body opening 160 in base end 130. Here, centrifugal force on blade 114 will force stacked damper pins 174 against closure member 166 in tip end 132 of body 128 of turbine blade 114 as the blade rotates. Similarly, during use in stationary nozzles 112, the weight of damper pins 174 will force them against retention damper pin 250 in base end 130, and/or against an inner end 252 of body opening 160 in base end 130. Body opening 160 in tip end 132 may be closed by any now known or later developed closure member 166.

Operation of vibration dampening system 120 will now be described. In operation, as shown in FIG. 9, first end surface 184 and second end surface 186 of adjacent damper pins 174 frictionally engage and rotationally move relative to one another as nozzle 112 or blade 114 moves. In this manner, damper pins 174 dampen vibration by having outer bodies 176 of adjacent damper pins 174 frictionally engage, i.e., via end surfaces 184, 186. In nozzles 112, damper pins 174 frictionally engage in this manner under the influence of the force of their collective weight, and in blades 112, damper pins 174 frictionally engage under the influence of their collective weight and centrifugal forces exerted on the blade during rotation thereof. Centrifugal forces are applied upwardly on the pages of FIGS. 5 and 6—see arrow CF.

Simultaneously to the above-described vibration dampening, as nozzle 112 or blade 114 vibrates, body 128 thereof bends. As this occurs, certain of the outer surface(s) of inner body 190 and the inner surface(s) of inner opening 178 frictionally engage to also dampen vibration. Frictional engagement may occur between outer surface 200 of bulbous portion 202 of inner body 190 and concave surface 204 of first section 198 of inner opening 178 of outer body 176. In contrast to the vibration dampening between end surfaces 184, 186, because inner body 190 is free to move apart from outer body 176, the frictional engagement described here occurs based on forces on inner body 190 only. More particularly, frictional engagement occurs under influence of, for nozzles 112, the weight of a respective inner body 190 and, for blades 114, the weight of a respective inner body 190 and the centrifugal forces on the respective inner body 190.

Frictional engagement between surfaces 200, 204 may also occur under the influence of one or more of plurality of arms 194 engaging inner surface 162 of body opening 160 in turbine nozzle 112 or blade 114. More particularly, plurality of arms 194 provide the largest outer dimension OD2 of damper pins 174, so they contact inner surface 162 of body opening 160 before any other part of damper pins 174. This arrangement provides an earlier point of engagement (compared to outer surface 182 of outer body 176 engaging with inner surface 162 of body opening 160), which forces each damper pin 174 (i.e., inner body 190 thereof) to have more movement than predecessor damper pins, generating a larger amount of motion and more friction-based vibration dampening. When plurality of arms 194 engage inner surface 162 of body opening 160 (e.g., bends with airfoil 134 during operation thereof impart motion to inner body 190 via arms 194), it can cause inner body 190 to move, rock or tilt relative to outer body 176 to generate a larger amount of motion and more friction-based vibration dampening. It is noted that frictional engagement can occur anywhere along the outer surfaces of inner body 190 and the inner surfaces of inner opening 178 of outer body 176, but mostly occurs at outer surface 200 of bulbous portion 202 of inner body 190 and concave surface 204 of first section 198 of outer body 176. For example, frictional engagement may occur near an upper portion (as illustrated on the page of FIG. 9) of bulbous portion 202 and concave surface 204 of outer body 176, i.e., where the latter enlarges to match the shape of inner body 190. Frictional engagement can also occur elsewhere between outer surface 200 of bulbous portion 202 and concave surface 204.

Referring again to FIGS. 5 and 6 to contrast operation between nozzles 112 and blades 114, for nozzles 112, the weight of inner body 190 alone forces surfaces 200 and 204 to frictionally engage, and the weight of damper pin(s) 174 (radially stacked) force end surfaces 184, 186 to frictionally engage. For nozzles 112, bottom parts (as illustrated) of each surface 200, 204 would frictionally engage. In contrast, for a blade 114, each damper pin 174 (at end surfaces 184, 186 of outer body 176 thereof) experiences the centrifugal forces of any damper pins 174 radially inward thereof (relative to turbine axis), which can cause them to bind and/or not move smoothly across one another over time and provide diminished vibration dampening. In either case, since inner bodies 190 are nested within outer bodies 176, frictionally engaging surfaces 200, 204 thereof do not experience as much force as frictionally engaging end surfaces 184, 186. Hence, it is less likely for inner bodies 190 to bind and more likely for them to retain freedom of movement and continue to dampen vibration even when end surfaces 184, 186 of adjacent damper pins 174 may bind and provide reduced vibration dampening.

Vibration dampening may also occur by frictional engagement of outer dimension OD1 of outer surface 182 of outer body 176 with inner dimension ID1 of inner surface 162 of body opening 160 in nozzle 112 or blade 114.

In view of the foregoing, a method of dampening vibration in turbine nozzle 112 or blade 114 may include, during operation of nozzle 112 or blade 114, a number of vibration dampening processes. Dampening vibration may occur by frictional engagement between and within a plurality of stacked damper pins 174. As noted, each damper pin 174 includes outer body 176 having inner opening 178, first end surface 184 and opposing second end surface 186. Vibration dampening may occur by frictional engagement of first end surface 184 and opposing second end surface 186 of adjacent damper pins 174. In FIGS. 5-7 and 9, complementary concave-convex end surfaces 184, 186 frictionally engage to dampen vibration. As noted, end surfaces 184, 186 may have other complementary shapes allowing frictional engagement to dampen vibration.

Each damper pin 174 also includes inner body 190 nested and movable within inner opening 178 of outer body 176. As described herein, additional vibration dampening occurs by frictional engagement of a portion of outer surface 200 of inner body 190 and a section 198 of inner opening 178 of outer body 176, e.g., concave surface 204, under influence of, among other forces, plurality of arms 194 engaging with inner surface 162 of body opening 160 in turbine nozzle 112 or blade 114. As noted, the method may also include vibration dampening by frictional engagement of outer dimension OD1 of outer surface 182 of outer body 176 with inner dimension ID1 of inner surface 162 of body opening 160 in nozzle 112 or blade 114.

Figure 10:
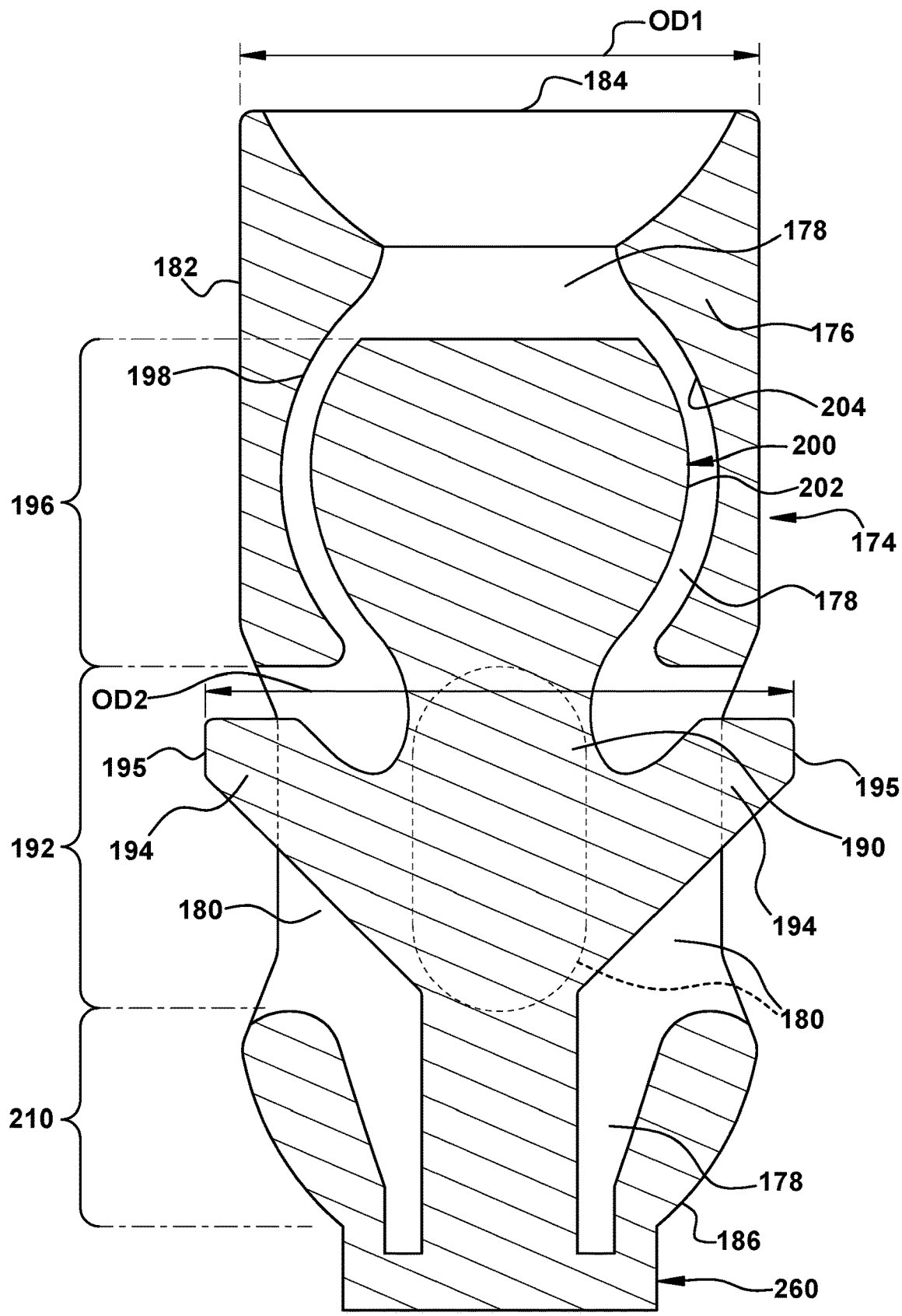
FIG. 10 shows a cross-sectional view of an additively manufactured damper pin, according to embodiments of the disclosure.

Damper pins 174 can be manufactured in any now known or later developed fashion. For example, outer and inner bodies 176, 190 can be cast, with outer body 176 in halves, and the parts can be assembled, e.g., by welding or otherwise fastening of the halves of outer body 176 positioned about inner body 190. Referring to FIG. 10, in one embodiment, outer body 176 and inner body 190 can be additively manufactured. Any form of additive manufacture appropriate for the materials used can be employed, such as but not limited to direct metal laser melting (DMLM). In this case, prior to separation after the additive manufacturing, outer body 176 and inner body 190 are integrally coupled and fixed relative to one another by a removable coupling element 260. In this manner, outer body 176 can be additively manufactured with and about inner body 190 with each of outer body 176 and inner body 190 being formed as a single, unitary body. Coupling element 260 can then be removed using any method (e.g., by cutting at the dashed line shown in FIG. 10), resulting in inner body 190 being nested in and movable within outer body 176, as described herein.

Embodiments of the disclosure provide various technical and commercial advantages, examples of which are discussed herein. Vibration dampening system 120 reduces nozzle or blade vibration with a simple arrangement and does not add much extra mass to nozzle 112 or blade 114. Vibration dampening system 120 does not increase centrifugal force to nozzle 112 base end 130 or blade 114 tip end 132 or require a change in nozzle 112 or blade 114 configuration. The nested damper pins 174 allow use of stacked damper pins in which inner bodies 190 are free to continue frictional-based vibration dampening movement (via interaction of arms 194 with inner surface 162 of body opening 160) even if outer bodies 176 bind together from, e.g., the collective weight of the damper pins and/or centrifugal forces, at end surfaces 184, 186.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and their practical application and to enable others of ordinary skill in the art to understand the disclosure for devising embodiments with various modifications as are suited to the particular use contemplated.

What is claimed is:

1. A damper pin for a vibration dampening system for a turbine nozzle or blade, the damper pin comprising:
    an outer body having defined therein an inner opening and a plurality of side openings extending from the inner opening through an outer surface of the outer body; and
    an inner body nested and movable within the inner opening of the outer body, the inner body including a first portion including a plurality of arms, each arm extending through a respective side opening of the plurality of side openings of the outer body,
    wherein the plurality of arms defines an outer dimension greater than an outer dimension of the outer body, the outer dimension of the plurality of arms being configured to engage an inner surface of a body opening in the turbine nozzle or blade in which the damper pin is positioned.

2. The damper pin of claim 1, wherein the outer body and the inner body are additively manufactured, and wherein, prior to separation after the additive manufacturing, the outer body and the inner body are integrally coupled and fixed relative to one another by a removable coupling element.

3. A damper pin for a vibration dampening system for a turbine nozzle or blade, the damper pin comprising:
    an outer body having defined therein an inner opening and a plurality of side openings extending from the inner opening through an outer surface of the outer body; and
    an inner body nested and movable within the inner opening of the outer body, the inner body including a first portion including a plurality of arms, each arm extending through a respective side opening of the plurality of side openings of the outer body, wherein the inner body further includes:
        a second portion having an outer surface configured to frictionally engage a first section of the inner opening of the outer body,
        a third portion extending through a second section of the inner opening of the outer body in a spaced manner, and wherein the first portion of the inner body including the plurality of arms is positioned between the second portion and the third portion of the inner body.

4. The damper pin of claim 3, wherein the outer surface of the second portion of the inner body has a bulbous portion, and the first section of the inner opening of the outer body has a complementary concave surface to the bulbous portion.

5. The damper pin of claim 3, wherein the second section of the inner opening of the outer body is spaced from the third portion of the inner body by a distance that delimits an amount of side-to-side tilting movement of the inner body within the outer body.

6. The damper pin of claim 3, wherein the outer surface of the inner body and the first section of the inner opening of the outer body frictionally engage under influence of the plurality of arms engaging an inner surface of a body opening in the turbine nozzle or blade.

7. The damper pin of claim 3, wherein the outer body further includes a first end surface and an opposing second end surface, and wherein the inner opening of the outer body extends through the first end surface and the second end surface, wherein the third portion of the inner body extends through one of the first and second end surfaces from the inner opening.

8. The damper pin of claim 7, wherein the damper pin is one of a plurality of identical damper pins in the vibration dampening system; wherein the first end surface of the outer body of each respective damper pin is at least partially concave, and the second end surface of the outer body of each respective damper pin is at least partially convex, whereby the first end surface of the damper pin is configured to frictionally engage with the second end surface of an adjacent damper pin.

9. A vibration dampening system for a turbine nozzle or blade, the vibration dampening system comprising:
   a plurality of stacked damper pins, each damper pin including:
      an outer body having defined therein an inner opening and a plurality of side openings extending from the inner opening through an outer surface of the outer body; and
      an inner body nested and movable within the inner opening of the outer body, the inner body including a first portion including a plurality of arms, each arm extending through a respective side opening of the plurality of side openings of the outer body.

10. The vibration dampening system of claim 9, wherein the plurality of arms define an outer dimension greater than an outer dimension of the outer body, the outer dimension of the plurality of arms being configured to engage an inner surface of a body opening in the turbine nozzle or blade in which the damper pin is positioned.

11. The vibration dampening system of claim 9, wherein the inner body further includes:
   a second portion having an outer surface configured to frictionally engage a first section of the inner opening of the outer body,
   a third portion extending through a second section of the inner opening of the outer body in a spaced manner, and
   wherein the first portion of the inner body including the plurality of arms is positioned between the second portion and the third portion of the inner body.

12. The vibration dampening system of claim 11, wherein the outer surface of the second portion of the inner body has a bulbous portion, and the first section of the inner opening of the outer body has a complementary concave surface to the bulbous portion.

13. The vibration dampening system of claim 11, wherein the second section of the inner opening of the outer body is spaced from the third portion of the inner body by a distance that delimits an amount of side-to-side tilting movement of the inner body within the outer body.

14. The vibration dampening system of claim 11, wherein the outer surface of the inner body and the first section of the inner opening of the outer body frictionally engage under influence of the plurality of arms engaging an inner surface of a body opening in the turbine nozzle or blade.

15. The vibration dampening system of claim 11, wherein the outer body further includes a first end surface and an opposing second end surface, and wherein the inner opening of the outer body extends through the first end surface and the second end surface, wherein the third portion of the inner body extends through one of the first and second end surfaces from the inner opening.

16. The vibration dampening system of claim 15, wherein the first end surface of the outer body is at least partially concave, and the second end surface of the outer body is at least partially convex, whereby the first end surface and the second end surface of adjacent damper pins frictionally engage.

17. The vibration dampening system of claim 9, wherein the outer body and the inner body are additively manufactured, and wherein, prior to separation after the additive manufacturing, the outer body and the inner body are integrally coupled and fixed relative to one another by a removable coupling element.

18. The vibration dampening system of claim 9, further comprising a retention damper pin engaging with an endmost one of the plurality of stacked damper pins.

* * * * *